(12) United States Patent
Nakajima

(10) Patent No.: US 9,192,061 B2
(45) Date of Patent: Nov. 17, 2015

(54) ELECTRONIC DEVICE

(71) Applicant: Kabushiki Kaisha Toshiba, Tokyo (JP)

(72) Inventor: Yuji Nakajima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 13/711,968

(22) Filed: Dec. 12, 2012

(65) Prior Publication Data

US 2013/0286562 A1 Oct. 31, 2013

(30) Foreign Application Priority Data

Apr. 27, 2012 (JP) ................................ 2012-102640

(51) Int. Cl.
*G06F 1/16* (2006.01)
*H05K 5/00* (2006.01)

(52) U.S. Cl.
CPC .............. *H05K 5/0017* (2013.01); *G06F 1/162* (2013.01); *G06F 1/1622* (2013.01); *G06F 1/1643* (2013.01); *G06F 1/1654* (2013.01)

(58) Field of Classification Search
CPC ...... G06F 1/1654; G06F 1/162; G06F 1/1622
USPC ........................... 361/679.55, 679.21; 16/221
See application file for complete search history.

(56) References Cited

U.S. PATENT DOCUMENTS

| | | | |
|---|---|---|---|
| 5,844,543 A | 12/1998 | Tamura et al. | |
| 6,658,272 B1 * | 12/2003 | Lenchik et al. | ............ 455/575.1 |
| 6,778,382 B2 | 8/2004 | Yim | |
| 6,839,576 B2 * | 1/2005 | Aagaard et al. | ............ 455/575.1 |
| 7,239,898 B2 * | 7/2007 | Lenchik et al. | ............ 455/575.1 |
| 7,280,346 B2 * | 10/2007 | Lewis et al. | .............. 361/679.01 |

(Continued)

FOREIGN PATENT DOCUMENTS

| | | |
|---|---|---|
| JP | H07-160364 A | 6/1995 |
| JP | H08-083136 A | 3/1996 |

(Continued)

OTHER PUBLICATIONS

Notice of Rejection mailed by the Japanese Patent Office on Feb. 12, 2013 in corresponding Japanese Patent Application No. 2012-102640, 6 pages.

(Continued)

*Primary Examiner* — David M Sinclair
*Assistant Examiner* — Robert Brown
(74) *Attorney, Agent, or Firm* — Knobbe, Martens, Olson & Bear LLP

(57) ABSTRACT

According to one embodiment, an electronic device includes: a first housing; a second housing; and a hinge. The first housing is substantially flat, substantially rectangular and substantially parallepiped shaped, and includes a display comprising a screen. The second housing is substantially flat, substantially rectangular and substantially parallelepiped shape, and includes a keyboard. The hinge rotatably connects a first corner of the first housing and a second corner of the second housing with each other. The electronic device is capable of taking at least: a first configuration in which the first housing covers the keyboard and in which the first housing and the second housing are overlapped in a thickness direction; and a second configuration in which a shorter side of the first housing is aligned with a longer side of the second housing and in which the first housing and the second housing intersect each other.

8 Claims, 12 Drawing Sheets

(56) References Cited

U.S. PATENT DOCUMENTS

| | | | |
|---|---|---|---|
| 7,428,143 B1* | 9/2008 | Jones et al. | 361/679.55 |
| 7,433,722 B2* | 10/2008 | Sakamoto et al. | 455/575.3 |
| 7,499,540 B2* | 3/2009 | Oliver | 379/433.13 |
| 7,580,518 B2* | 8/2009 | Harmon et al. | 379/433.13 |
| 7,590,433 B2* | 9/2009 | Sung et al. | 455/575.1 |
| 7,619,686 B2* | 11/2009 | Tom | 348/376 |
| 7,669,289 B2* | 3/2010 | Shih et al. | 16/367 |
| 7,844,050 B2* | 11/2010 | Hwang et al. | 379/433.13 |
| 7,870,645 B2* | 1/2011 | Kim | 16/366 |
| 8,024,843 B2* | 9/2011 | Endo et al. | 16/367 |
| 8,042,231 B2* | 10/2011 | Bae et al. | 16/367 |
| 8,081,450 B2* | 12/2011 | Guo | 361/679.56 |
| 8,995,116 B2 | 3/2015 | Hung et al. | |
| 2004/0066616 A1* | 4/2004 | Chen et al. | 361/683 |
| 2006/0185123 A1* | 8/2006 | Kuramochi | 16/221 |
| 2006/0250761 A1* | 11/2006 | Tsai et al. | 361/681 |
| 2008/0204985 A1* | 8/2008 | Bae et al. | 361/681 |
| 2009/0290297 A1* | 11/2009 | Lee et al. | 361/679.21 |
| 2010/0265648 A1 | 10/2010 | Hirabayashi | |
| 2011/0292584 A1* | 12/2011 | Hung et al. | 361/679.26 |

FOREIGN PATENT DOCUMENTS

| | | |
|---|---|---|
| JP | 10-055227 A | 2/1998 |
| JP | 2000-151781 A | 5/2000 |
| JP | 2001-331238 A | 11/2001 |
| JP | 2003-532351 A | 10/2003 |
| JP | 2005-004384 A | 1/2005 |
| JP | 2005-106073 A | 4/2005 |
| JP | 2008-263622 A | 10/2008 |
| JP | 2010-256973 A | 11/2010 |
| JP | 2011-154304 A1 | 8/2011 |
| JP | 2011-248872 A1 | 12/2011 |
| WO | WO 01/84269 A3 | 11/2001 |

OTHER PUBLICATIONS

Notice of Rejection mailed by the Japanese Patent Office on May 28, 2013 in corresponding Japanese Patent Application No. 2012-102640, 4 pages.

Notice of Rejection mailed by the Japanese Patent Office on Jun. 10, 2014 in corresponding Japanese Patent Application No. 2013-164325, which is a divisional application of JP 2012-102640, 8 pages.

Decision of Rejection mailed by the Japanese Patent Office on Oct. 14, 2014 in corresponding Japanese Patent Application No. 2013-164325, which is a divisional application of JP 2012-102640, 2 pages.

* cited by examiner

ELECTRONIC DEVICE

CROSS-REFERENCE TO RELATED APPLICATIONS

This application is based upon and claims the benefit of priority from Japanese Patent Application No. 2012-102640, filed on Apr. 27, 2012, the entire contents of which are incorporated herein by reference.

FIELD

Embodiments described herein relate generally to an electronic device.

BACKGROUND

Conventionally, there are known electronic devices comprising a housing with a display and a housing with a keyboard that are rotatably connected to each other through a hinge.

In this type of electronic devices, it is desirable to couple the two housings with each other in a nonconventional form results in advantages such as improvement in usability.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
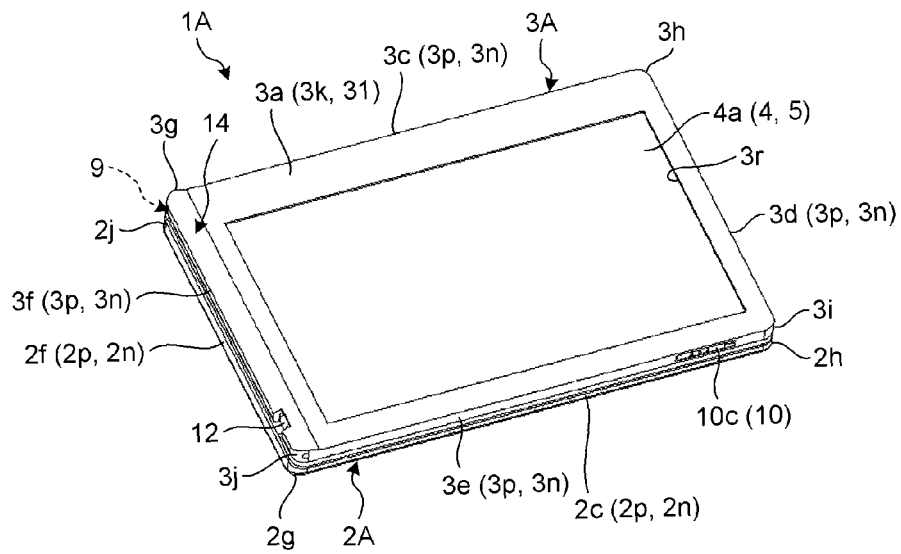
FIG. 1 is an exemplary perspective view of an electronic device in a first configuration according to a first embodiment.

In general, according to one embodiment, an electronic device comprises: a first housing; a second housing; and a hinge. The first housing is configured to be substantially flat, substantially rectangular, and substantially parallelepiped shaped, and comprises a display comprising a screen. The second housing is configured to be substantially flat, substantially rectangular, and substantially parallelepiped shaped, and comprises a keyboard. The hinge is configured to rotatably connect a first corner of the first housing and a second corner of the second housing with each other. The electronic device is capable of taking at least: a first configuration in which the first housing covers the keyboard and in which the first housing and the second housing are overlapped in a thickness direction; and a second configuration in which a shorter side of the first housing is aligned with a longer side of the second housing and in which the first housing and the second housing intersect each other.

Exemplary embodiments described in the followings comprise the same constituent elements. Therefore, in the followings, the same constituent elements are given with common reference numerals, and their redundant explanations are omitted.

In the following embodiments, an electronic device is exemplified as one that is configured as a personal computer. However, the electronic device according to the embodiments is not limited to this. The electronic device in the embodiments can be configured as, for example, an electronic device that is deformable having two connectable (detachable) portions (housings) such as a smart television, a cellular phone, a video display device, and a video phone.

In a first embodiment, as one example, as illustrated in FIGS. 1 to 5, an electronic device 1A comprises a first housing 3A and a second housing 2A. Specifically, in the first housing 3A (a first portion), at least a part of a display device 4 is housed. In the first housing 3A, a transparent touch panel 5 (a touch sensor, an input operation module, an input receiving module, and an input module) overlaid on the display device 4 is further provided. A user and others can view a video (an image) displayed on a display screen 4a of the display device 4 through the touch panel 5.

Figure 4:
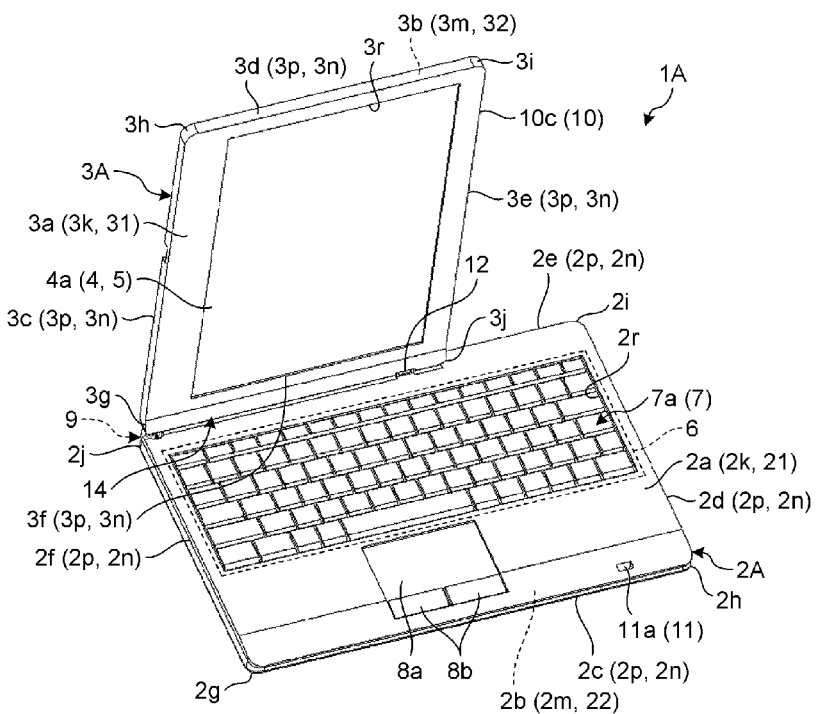
FIG. 4 is an exemplary perspective view of the electronic device in the second configuration in the first embodiment.

As illustrated in FIG. 4, in the second housing 2A (a second portion), a substrate 6 is housed. In the second housing 2A, a keyboard 7 (an input operation module, an input receiver, and an input module), a pointing device 8a (an input operation module, an input receiver, an input module), and click buttons 8b (input operation modules, input receivers, and input modules), for example, are further provided.

The first housing 3A and the second housing 2A are rotatably connected by a hinge mechanism 9 (a hinge, a connecting portion, a coupling portion, a rotation supporting portion, a connecting mechanism, a coupling mechanism, a rotation supporting mechanism, see FIGS. 6 to 10). The hinge mechanism 9 connects a corner 3g (a first corner) of the first housing 3A and a corner 2j (a second corner) of the second housing 2A. The hinge mechanism 9 comprises a portion housed inside the first housing 3A and a portion housed inside the second housing 2A. The first housing 3A and the second housing 2A are connected to each other by the hinge mechanism 9 to be rotatable at least between a first configuration (a folded state) illustrated in FIG. 1 and a second configuration (an expanded state) illustrated in FIGS. 4 and 5. In the first embodiment, as one example, the hinge mechanism 9 connects the first housing 3A and the second housing 2A to be rotatable around a rotation axis Ax1 and a rotation axis Ax2 (see FIGS. 6 to 10). The hinge mechanism 9 may be configured to connect corners other than the corners 3g and 2j.

The display screen 4a of the display device 4 is visible through an opening 3r provided on a surface 3a (an anterior surface, a top surface, a front face, a face portion) of the first housing 3A. The keyboard 7, the pointing device 8a, the click buttons 8b, and the like are exposed on a surface 2a (an anterior surface, a top surface, a front face, a face portion) of the second housing 2A. There may be a case where one side of the first housing 3A in a thickness direction is covered with a touch panel. In this case, the surface of the touch panel is the surface of the first housing. Furthermore, there may be a case where a display device with a touch panel (not illustrated) is provided on the second housing 2A in place of the keyboard. Moreover, there may be a case where one side of the second housing 2A in a thickness direction is covered with a touch panel. In those cases, the surface of the touch panel is the surface of the second housing.

In the first configuration illustrated in FIG. 1, the first housing 3A and the second housing 2A are overlapped in the thickness directions thereof. As one example, the surface 2a is covered with the first housing 3A, and the first housing 3A is placed on top of the surface 2a exposing the surface 3a. The first housing 3A and the second housing 2A have substantially the same quadrangular shape (in the first embodiment, a rectangular shape as one example) in appearance with the line of sight in the thickness direction. In the first configuration, surfaces 3p (side surfaces, circumferential surfaces) of the first housing 3A and surfaces 2p (side surfaces, circumferential surfaces) of the second housing 2A lie in line with virtually no steps, constituting a series of side surfaces. Between the surfaces 3p and the surfaces 2p, recessed portions (gaps and grooves) are formed. In the first configuration, the electronic device 1A can be used as a so-called tablet type (slate type) electronic device.

In the first embodiment, as one example, the electronic device 1A can be used in both of a so-called vertically long state (posture) in which shorter end portions 3d and 3f (sides or shorter sides) of the first housing 3A are arranged on the top and bottom and longer end portions 3c and 3e (sides, longer sides) thereof are arranged on the right and left, and a so-called horizontally long state (posture) in which the longer end portions 3c and 3e are arranged on the top and bottom and the shorter end portions 3d and 3f are arranged on the right and left. As one example, the electronic device 1A can comprise a sensor that detects the posture of the first housing 3A or the second housing 2A. A display controller (a controller, not illustrated) of the electronic device 1A can switch the direction and size, for example, of an image (video) displayed on the display screen 4a in response to the detection result of the sensor.

The electronic device 1A can comprise a sensor (as one example, a magnetic sensor, not illustrated) that detects positions of the first housing 3A and the second housing 2A, a distance therebetween, or a posture thereof. When the first configuration is determined from the detection result of the sensor, the controller (not illustrated) of the electronic device 1A can, as one example, cut off the power required for the operation of devices hidden by the first housing 3A (in the first embodiment, as one example, the keyboard 7, the pointing device 8a, and the click buttons 8b) or negate the input signals from those devices.

Figure 5:
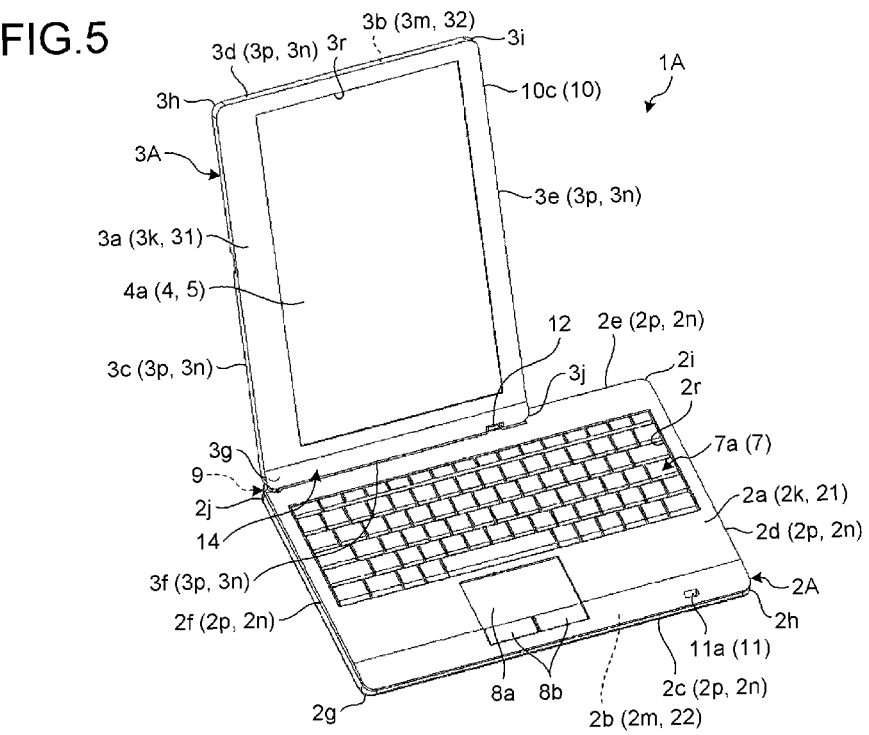
FIG. 5 is an exemplary perspective view of the electronic device in another posture in the second configuration in the first embodiment.

Meanwhile, in the second configuration illustrated in FIGS. 4 and 5, the end portion 3f (a side, a shorter side) of the first housing 3A and the end portion 2e (a side, a longer side) of the second housing 2A are aligned with and come closer to each other, and the first housing 3A (the surface 3a thereof) and the second housing 2A (the surface 2a thereof) intersect each other. In the second configuration, both the surface 3a and the surface 2a can be exposed. In the second configuration, the electronic device 1A can be used as a so-called notebook type (clamshell type) electronic device. As is apparent from FIGS. 4 and 5, in the first embodiment, as one example, when the electronic device 1A is placed on a placement surface (not illustrated) in a posture where the surface 2a of the second housing 2A is on the upper side, the first housing 3A is arranged to be longer in an up-down direction in a so-called vertically long state (posture) where the shorter end portions 3d and 3f are positioned at the top and bottom and the longer end portions 3c and 3e are positioned at the right and left. Under such arrangement, the display screen 4a is also arranged in a vertically long state (posture). Accordingly, the electronic device 1A in the first embodiment in such second configuration, as one example, may be convenient in situations such as browsing websites using a browser or typing documents.

In the first embodiment, as one example, as illustrated in FIGS. 1 to 5, the first housing 3A is configured in a quadrangular shape (in the first embodiment, a rectangular shape as one example) in a frontal view and in a back view. Furthermore, in the first embodiment, as one example, the first housing 3A is configured in a thin and flat rectangular parallelepiped shape. The first housing 3A comprises the surface 3a and a surface 3b (a rear surface, a lower surface, a back surface, a surface portion) opposite the surface 3a. The surface 3a and the surface 3b are substantially in parallel with each other. The first housing 3A comprises four end portions 3c to 3f (sides, edge portions) and four corners 3g to 3j (protruding portions, rounded portions, end portions) in a frontal view with respect to the surface 3a. The end portions 3c and 3e are examples of longer sides. The end portions 3d and 3f are examples of shorter sides.

The first housing 3A comprises, as one example, a wall 3k (a portion, a plate, a frame, a front wall, a surface wall, a top wall) having the surface 3a and a wall 3m (a portion, a plate, a rear wall, a back wall, a bottom wall) having the surface 3b. The walls 3k and 3m are in a quadrangular shape (in the first embodiment, a rectangular shape as one example). The first housing 3A comprises four walls 3n (portions, plates, side walls, end walls, standing walls, spans) having the surfaces 3p (side surfaces, circumferential surfaces) extending between the wall 3k and the wall 3m. On the wall 3k, the opening 3r in a quadrangular shape as one example is provided. Therefore, the wall 3k is in a quadrangular and frame-like shape.

Furthermore, the first housing 3A can be configured, as one example, with a plurality of components (segmented bodies) combined. In the first embodiment, as one example, the first housing 3A comprises a first housing member 31 (a first portion, a front side member, a mask, a mask portion, a cover, a front cover, a cover portion, a first area) including at least the wall 3k, and a second housing member 32 (a second portion, a back side member, a base, a base portion, a bottom, a bottom portion, a cover, a rear cover, a cover portion, a second area) including at least the wall 3m. The walls 3n are included in at least either one of the first housing member 31 or the second housing member 32 (for example, the second housing member 32). Moreover, the first housing 3A may comprise, in addition to the first housing member 31 and the second housing member 32, a third housing member (a third portion, an intermediate member, an isolating member, a barrier wall member, a wall member, an intervening member, an inner plate, a middle plate, a middle frame, a third area, not illustrated), a fourth housing member (a fourth portion, an intermediate member, an isolating member, a barrier wall member, a wall member, an intervening member, a covering member, a shield, a fourth area, not illustrated), and others positioned between the first housing member 31 and the second housing member 32. The first housing 3A may be composed of, for example, metallic or synthetic resin material.

In the first embodiment, as one example, the display screen 4a of the display device 4 (a display module, a display, a panel) positioned on the surface 3a side is exposed towards the front (outside) of the first housing 3A through the opening 3r. A user, for example, can view the display screen 4a through the opening 3r from the front side. The display device 4 is configured in a quadrangular shape (in the first embodiment, a rectangular shape as one example) in a frontal view. Furthermore, the display device 4 is configured in a rectangular parallelepiped shape being thin and flat in a front-back direction. The display device 4 is, for example, a liquid crystal display (LCD) or an organic electro-luminescent display (OELD).

In the first embodiment, as one example, on the front side (a surface side, the wall 3k side) of the display device 4, the touch panel 5 (as one example, an input operation panel, a touch sensor, an operation surface, a cover) is provided. The touch panel 5 is configured to be transparent and in a relatively thin quadrangular shape, covering the display screen 4a. A user, for example, can execute input process by performing an operation of touching, pressing, or rubbing the touch panel 5 with a finger or a component (for example, a stylus, not illustrated), or moving the finger or the stylus near the touch panel 5. The light emitted from the display screen 4a of the display device 4 passes through the touch panel 5 and goes out ahead (outside) of the first housing 3A through the opening 3r of the wall 3k.

In the first embodiment, as one example, as illustrated in FIGS. 1 to 5, the second housing 2A is configured in a quadrangular shape (in the first embodiment, a rectangular shape as one example) in a frontal view and in a back view. In the first embodiment, as one example, the second housing 2A is configured in a thin and flat rectangular parallelepiped shape. The second housing 2A comprises the surface 2a and a surface 2b (a rear surface, a lower surface, a back surface, a surface portion) on the side opposite to the surface 3a. The surface 2a and the surface 2b are substantially in parallel with each other. The second housing 2A further comprises four end portions 2c to 2f (sides, edge portions) and four corners 2g to 2j (protruding portions, rounded portions, end portions) in a frontal view with respect to the surface 2a. The end portions 2c and 2e are examples of longer sides. The end portions 2d and 2f are example of shorter sides.

The second housing 2A comprises, as one example, a wall 2k (a portion, a plate, a frame, a front wall, a surface wall, a top wall) having the surface 2a and a wall 2m (a portion, a plate, a rear wall, a back wall, a bottom wall) having the surface 2b. The walls 2k and 2m are in a quadrangular shape (in the first embodiment, a rectangular shape as one example). The second housing 2A further comprises four walls 2n (portions, plates, side walls, end walls, standing walls, spans) having the surfaces 2p (side surfaces, circumferential surfaces) extending between the wall 2k and the wall 2m. On the wall 2k, an opening 2r in a quadrangular shape as one example is provided. Accordingly, the wall 2k is in a quadrangular and frame-like shape.

Furthermore, the second housing 2A can be configured, as one example, with a plurality of components (segmented bodies) combined. The second housing 2A, in the first embodiment, as one example, comprises a first housing member 21 (a first portion, a front side member, a mask, a mask portion, a cover, a front cover, a cover portion, a first area) including at least the wall 2k, and a second housing member 22 (a second portion, a back side member, a base, a base portion, a bottom, a bottom portion, a cover, a rear cover, a cover portion, a second area) including at least the wall 2m. The walls 2n are included in at least either one of the first housing member 21 or the second housing member 22 (for example, the second housing member 22). Moreover, the second housing 2A may comprise, in addition to the first housing member 21 and the second housing member 22, a third housing member (a third portion, an intermediate member, an isolating member, a barrier wall member, a wall member, an intervening member, an inner plate, a middle plate, a middle frame, a third area, not illustrated), a fourth housing member (a fourth portion, an intermediate member, an isolating member, a barrier wall member, a wall member, an intervening member, a cover member, a shield, a fourth area, not illustrated), and others positioned between the first housing member 21 and the second housing member 22. The second housing 2A may be composed of, for example, metallic or synthetic resin material.

In the first embodiment, as one example, an operation surface 7a (a surface, a top surface) of the keyboard 7 is exposed towards the front (outside) of the second housing 2A through the opening 2r. On the surface 2a, the keyboard 7 is positioned close to the end portion 2e side, and the pointing device 8a and the click buttons 8b are arranged close to the end portion 2c side on the side opposite to the end portion 2e. The end portion 2e is positioned on the back side in a depth direction (a front-back direction), and the end portion 2c is positioned on the nearer side.

In the first embodiment, as one example, as illustrated in FIG. 4, inside the second housing 2A, one or more of the substrates 6 (a circuit board, a control board, a main board, an electric component, a first electric component) are housed on the rear side (an under side, a back side, the wall 2m side, the side opposite to the operation surface 7a) of the keyboard 7. The substrates 6 are provided substantially in parallel with the keyboard 7. The substrates 6 are provided away from the walls 2k, 2m, 2n, and others, in other words, in a condition in which spaces (gaps) are formed between the substrate 6 and all of the walls 2k, 2m, 2n, and others.

In the first embodiment, as one example, on the substrates 6, a plurality of components (not illustrated), for example, a central processing unit (CPU), a graphics controller, power supply circuit components, a platform controller hub (PCH), a memory slot connector, an LCD connector, an input/output (I/O) connector, a power coil, elements, and connectors may be mounted. The control circuit may include, for example, a video signal processing circuit, a tuner, a high-definition multimedia interface (HDMI) signal processor, an audio video (A/V) input terminal, a remote control signal receiver, a controller, a selector, an on-screen display interface, a storage module (for example, a read only memory (ROM), a random access memory (RAM), a hard disk drive (HDD), and a solid state drive (SSD)), and an audio signal processing circuit. The control circuit controls, for example, the output of video (such as movies and still pictures) on the display screen 4a of the display device 4, the output of audio from a speaker (not illustrated), and light emission of a light emitting diode (LED, not illustrated). The display device 4, the speaker, and the LED are examples of output modules.

In the first embodiment, as one example, on the surfaces 3p of the first housing 3A and the surfaces 2p of the second housing 2A, for example, a connector and others (not illustrated) may be provided. The connector may be, for example, a connector for a power cable, a universal serial bus (USB) connector, a card connector, and a connector for earphones and a microphone. The connector is exposed through openings (not illustrated) provided, for example, on the walls 3n and 2n of the first housing 3A and the second housing 2A, respectively. The connector and operation modules (not illustrated) may be provided on a surface other than the surfaces 3p and 2p.

In the first embodiment, as one example, as illustrated in FIGS. 6 to 10, the hinge mechanism 9 comprises a first member 9a, a second member 9b, a third member 9c, a fourth member 9d, and others. Specifically, the first member 9a is secured to the second housing 2A. The first member 9a is a plate-like member and is provided with a binding portion 9e (such as a through hole and a cutout, and in the first embodiment, through holes as one example) to be bound with the second housing 2A. The first member 9a is supported on a shaft 9f of the second member 9b to be rotatable around the rotation axis Ax1. The second member 9b comprises the shaft 9f and flanges 9g and 9h. Between the flange 9g and the first member 9a, a plurality of annular and disc-spring formed resistance members 9i surrounding the shaft 9f (a small diameter portion) are sandwiched. The resistance members 9i provide pressing force between the flange 9h (a large diameter portion) and the first member 9a by their elastic force. This causes frictional resistance torque (or holding torque to hold a posture) when the first member 9a rotates with respect to the shaft 9f.

The third member 9c is secured to the second member 9b with a binding tool 9r (a fixing tool) such as a screw. In other words, the second member 9b and the third member 9c are integrally combined. The third member 9c comprises a shaft 9j and flanges 9k and 9m. The shaft 9j intersects the shaft 9f (in the first embodiment, orthogonal as one example). The rotation axis Ax1 is a center axis of the shaft 9f and the rotation axis Ax2 is a center axis of the shaft 9j. Accordingly, the rotation axes Ax1 and Ax2 intersect each other (in the first embodiment, orthogonal as one example). The fourth member 9d is supported on the shaft 9j of the third member 9c to be rotatable around the rotation axis Ax2. Between the flange 9k and the fourth member 9d, a plurality of annular and disc-spring formed resistance members 9n surrounding the shaft 9j (a small diameter portion) are sandwiched. The resistance members 9n provide pressing force between the flange 9m (a large diameter portion) and the fourth member 9d by their elastic force. This causes frictional resistance torque (or holding torque to hold a posture) when the fourth member 9d rotates with respect to the shaft 9j. The fourth member 9d is a plate-like member and is provided with a binding portion 9p (such as a through hole and a cutout, and in the first embodiment, through holes as one example) to be bound with the first housing 3A.

Figure 2:
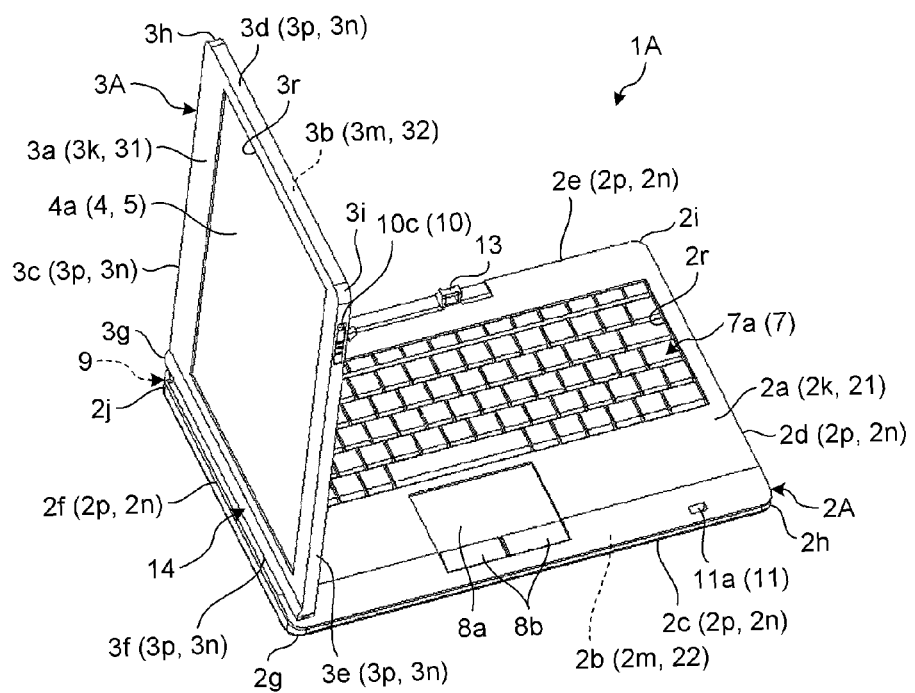
FIG. 2 is an exemplary perspective view of the electronic device in a posture between the first configuration and a second configuration, in the first embodiment.
Figure 6:
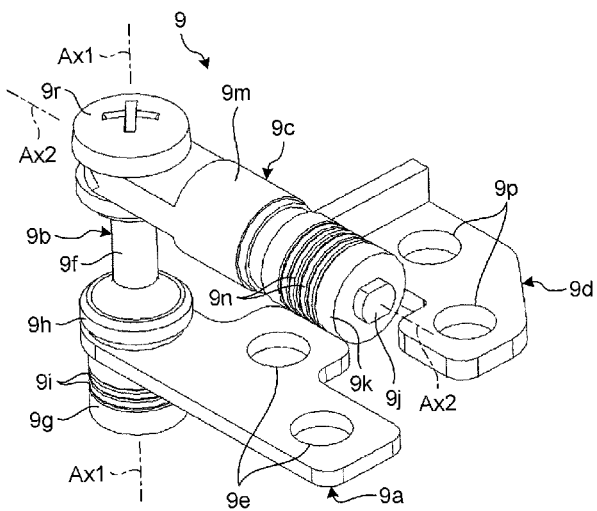
FIG. 6 is an exemplary perspective view a hinge comprised in the electronic device in a state corresponding to the posture in FIG. 1, in the first embodiment.
Figure 7:
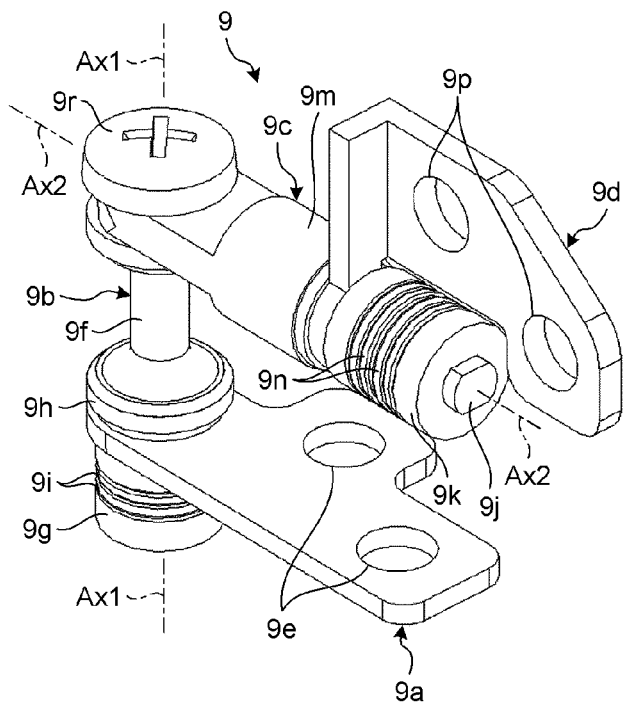
FIG. 7 is an exemplary perspective view of the hinge comprised in the electronic device in a state corresponding to the posture in FIG. 2, in the first embodiment.
Figure 8:
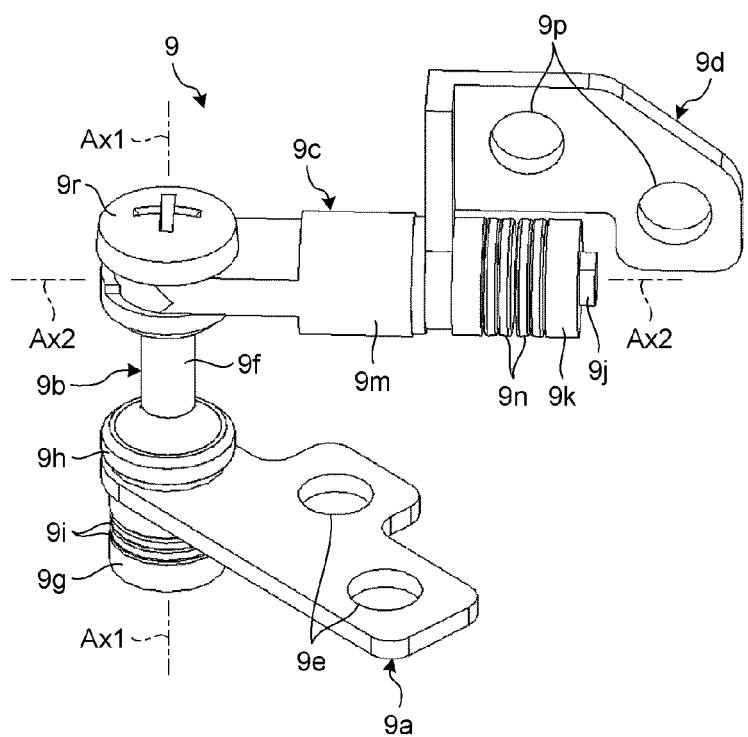
FIG. 8 is an exemplary perspective view of the hinge comprised in the electronic device in a state corresponding to the posture in FIG. 3, in the first embodiment.
Figure 9:
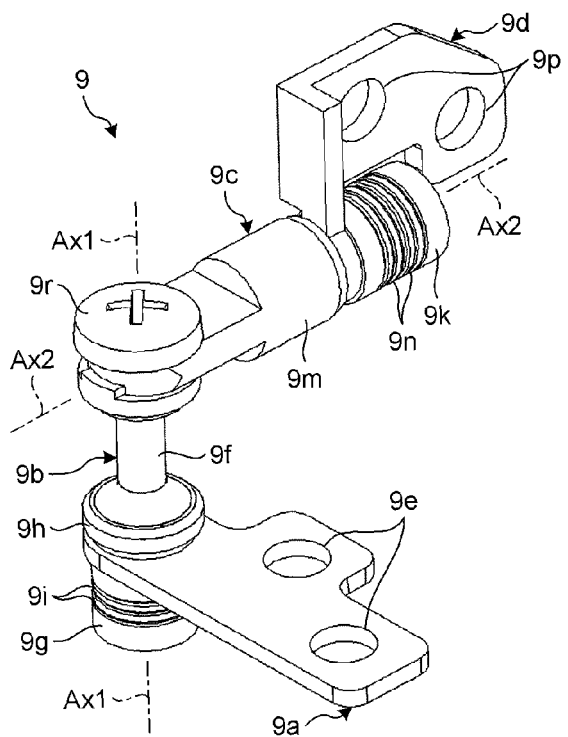
FIG. 9 is an exemplary perspective view of the hinge comprised in the electronic device in a state corresponding to the posture in FIG. 4, in the first embodiment.
Figure 10:
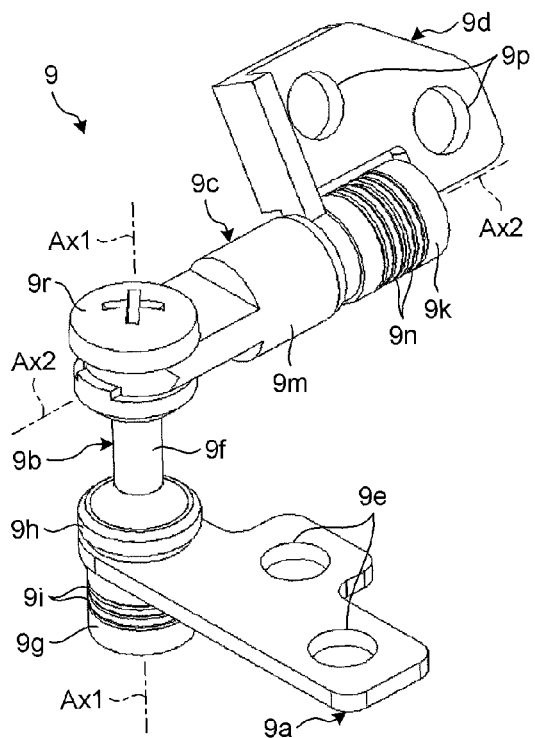
FIG. 10 is an exemplary perspective view of the hinge comprised in the electronic device in a state corresponding to the posture in FIG. 5, in the first embodiment.

In the first embodiment, as one example, when the electronic device 1A changes from the first configuration illustrated in FIG. 1 to the posture illustrated in FIG. 2, the hinge mechanism 9 changes from the state illustrated in FIG. 6 to the state illustrated in FIG. 7. More specifically, the fourth member 9d rotates about 90 degrees around the rotation axis Ax2 with respect to the shaft 9j of the third member 9c. When the electronic device 1A changes from the posture illustrated in FIG. 2 to the posture illustrated in FIG. 3, the hinge mechanism 9 changes from the state illustrated in FIG. 7 to the state illustrated in FIG. 8. More specifically, the second member 9b, the third member 9c, and the fourth member 9d rotate around the rotation axis Ax1 with respect to the first member 9a. When the electronic device 1A changes from the posture illustrated in FIG. 3 to the second configuration illustrated in FIG. 4, the hinge mechanism 9 changes from the state illustrated in FIG. 8 to the state illustrated in FIG. 9. More specifically, the second member 9b, the third member 9c, and the fourth member 9d further rotate around the rotation axis Ax1 with respect to the first member 9a. In other words, when the electronic device 1A changes from the state illustrated in FIG. 2 through the state illustrated in FIG. 3 to the state illustrated in FIG. 4, the second member 9b, the third member 9c, and the fourth member 9d rotate about 90 degrees around the rotation axis Ax1 with respect to the first member 9a. When the electronic device 1A changes from the posture illustrated in FIG. 4 to the posture illustrated in FIG. 5, the hinge mechanism 9 changes from the state illustrated in FIG. 9 to the state illustrated in FIG. 10. More specifically, the fourth member 9d rotates around the rotation axis Ax2 with respect to the third member 9c. The changes in the posture of the electronic device 1A (the first housing 3A and the second housing 2A) illustrated in FIGS. 1 to 5 and the changes in each component of the hinge mechanism 9 illustrated in FIGS. 6 to 10 are reversible. In other words, when the electronic device 1A changes from the second configuration illustrated in FIG. 5 through the states illustrated in FIGS. 4, 3, and 2 to the first configuration illustrated in FIG. 1, the hinge mechanism 9 changes from the state illustrated in FIG. 10 through the states illustrated in FIGS. 9, 8, and 7 to the state illustrated in FIG. 6. Accordingly, the changes in the posture of the electronic device 1A illustrated in FIGS. 1 to 5 can be realized by the hinge mechanism 9 illustrated in FIGS. 6 to 10.

Figure 11:
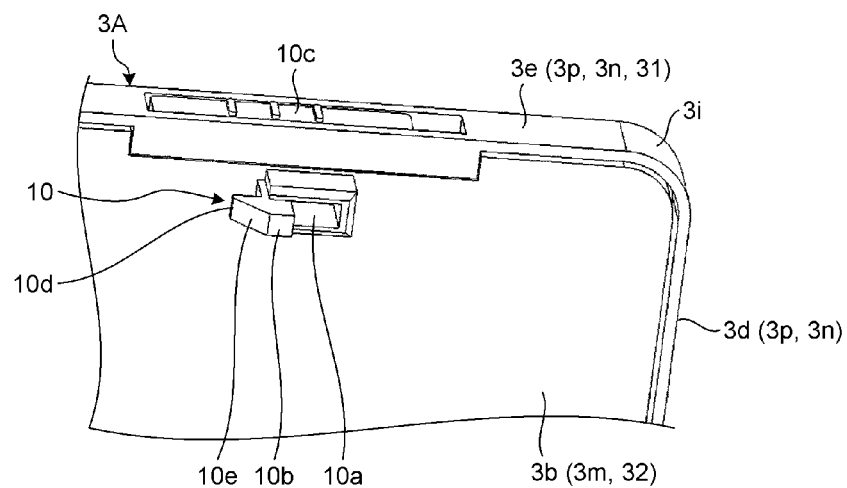
FIG. 11 is an exemplary perspective view of a portion of a first housing of the electronic device where a first engage portion is provided, in the first embodiment.

In the first embodiment, as one example, the electronic device 1A has a configuration in which the first housing 3A and the second housing 2A are coupled (latched, engaged, supported) in each of the first configuration and the second configuration, in addition to the hinge mechanism 9. Specifically, in the first configuration, a first engage portion 10 provided on the first housing 3A and a second engage portion 11 provided on the second housing 2A engage with each other. In the first embodiment, as one example, as illustrated in FIG. 11, the first engage portion 10 comprises a hook 10b protruding from an opening 10a provided on the surface 3b (the wall 3m) of the first housing 3A. The opening 10a extends along the end portion 3e. The hook 10b (an engage portion, a moving portion, a slider, a protruding portion, a supporting portion) is supported by the first housing 3A to be movable (to go back and forth) along a longer direction of the opening 10a (the end portion 3e). On the surface 3p (the wall 3n) of the first housing 3A, an operator 10c (an operating portion, a moving portion, a slider) that is movable (can go back and force) along the end portion 3e is provided. The operator 10c and the hook 10b are bound together inside the first housing 3A and integrally move along the end portion 3e. The hook 10b comprises a claw portion 10d (a protrusion, a protruding portion, a projecting portion, an engaging portion) projecting on one side (left side in FIG. 11) along the end portion 3e. At least one of the end portion 3e and the operator 10c is biased by an elastic member (as one example, a coil spring, not illustrated) in a direction in which the claw portion 10d is projecting.

Figure 12:
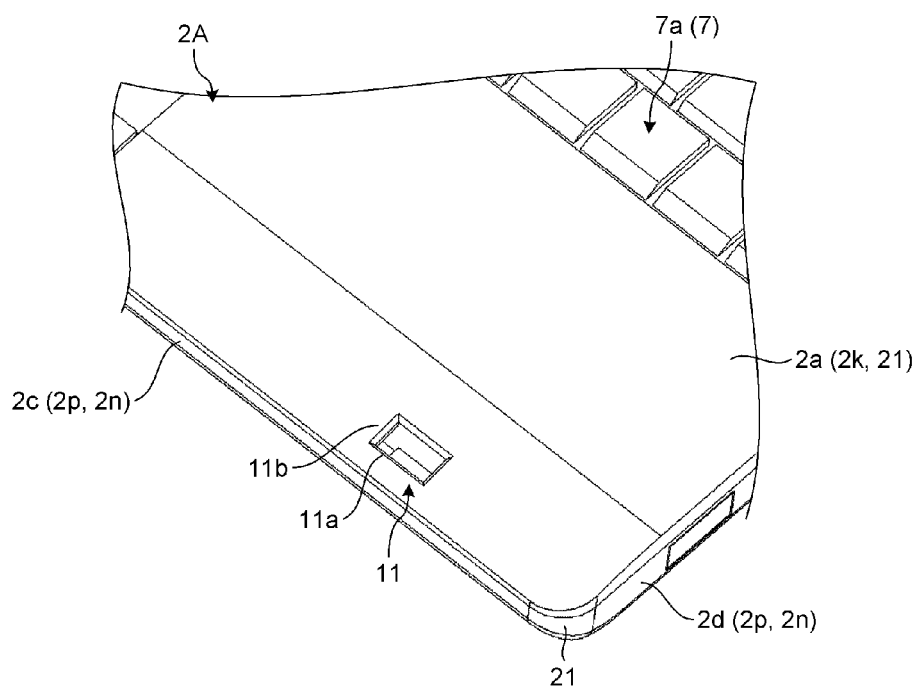
FIG. 12 is an exemplary perspective view of a portion of a second housing of the electronic device where a second engage portion is provided, in the first embodiment.

Meanwhile, in the first embodiment, as one example, as illustrated in FIG. 12, the second engage portion 11 is an edge 11b of an opening 11a provided on the surface 2a (the wall 2k) of the second housing 2A. The opening 11a extends along the end portion 2c of the second housing 2A. When the first housing 3A and the second housing 2A are placed on top of each other in the first configuration, the hook 10b provided on the first housing 3A is inserted into the opening 11a provided on the second housing 2A. The hook 10b biased by the elastic member engages with the edge 11b (a coupling portion, a latching portion, a supporting portion, a wall portion, an engaging portion) positioned on one side (left side in FIG. 12) in the longer direction of the opening 11a of the wall 2k. Because the claw portion 10d of the hook 10b is positioned on the back side (inside the housing) of the edge 11b (the wall 2k), the hook 10b and the edge 11b engage with (latch onto) each other, whereby the first housing 3A and the second housing 2A are prevented from separating in the thickness directions thereof. More specifically, by the first engage portion 10 and the second engage portion 11 being engaged with each other, the first housing 3A and the second housing 2A in an overlapped state in the first configuration are prevented from opening. In other words, the electronic device 1A is prevented from changing from the first configuration illustrated in FIG. 1 to the posture illustrated in FIG. 2. However, in the first embodiment, as one example, by moving the operator 10c to separate the hook 10b away from the edge 11b, a user and others can release the engaging of the first engage portion 10 and the second engage portion 11, separate the first housing 3A and the second housing 2A away from each other, and change the electronic device 1A from the first configuration to another posture. Furthermore, in the first embodiment, as one example, the hook 10b is provided with an inclined surface 10e (an inclined portion). Accordingly, when a user and others makes the first housing 3A and the second housing 2A come closer to each other such as from the state illustrated in FIG. 2 to the state illustrated in FIG. 1, the edge 11b of the opening 11a on the wall 2k of the second housing 2A hits the inclined surface 10e moving the hook 10b in a direction away from the edge 11b, and at a point in time the edge 11b no longer hits the inclined surface 10e, the hook 10b is pushed back towards the edge 11b by the elastic member. Consequently, in accordance with the first embodiment, as one example, when a user and others makes the first housing 3A and the second housing 2A come closer such that the electronic device 1A takes the first configuration, the trouble of operating the operator 10c is saved.

Figure 13:
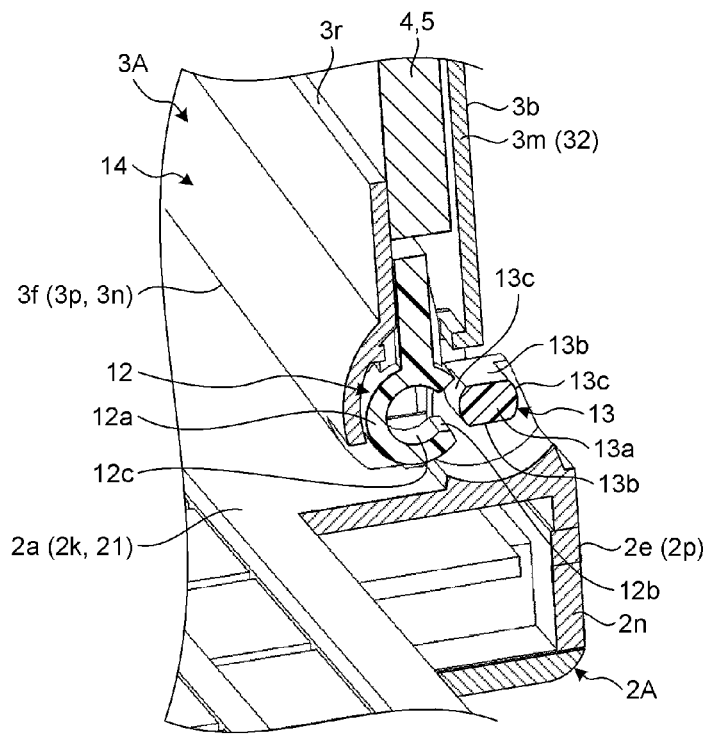
FIG. 13 is an exemplary perspective view of a cross-section including a third engage portion and a fourth engage portion of the electronic device in a state before the third engage portion and the fourth engage portion are engaged, in the first embodiment.
Figure 14:
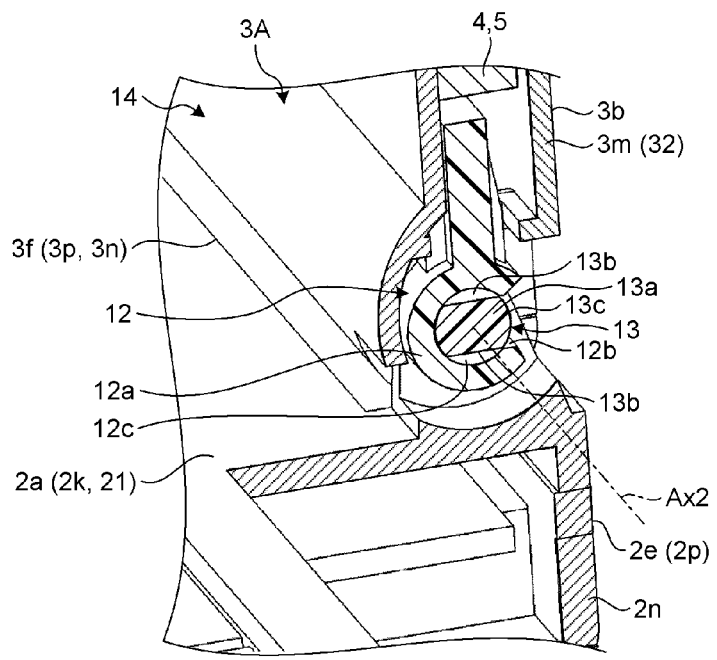
FIG. 14 is an exemplary perspective view of a cross-section including the third engage portion and the fourth engage portion of the electronic device in a state that the third engage portion and the fourth engage portion are engaged, in the first embodiment.
Figure 15:
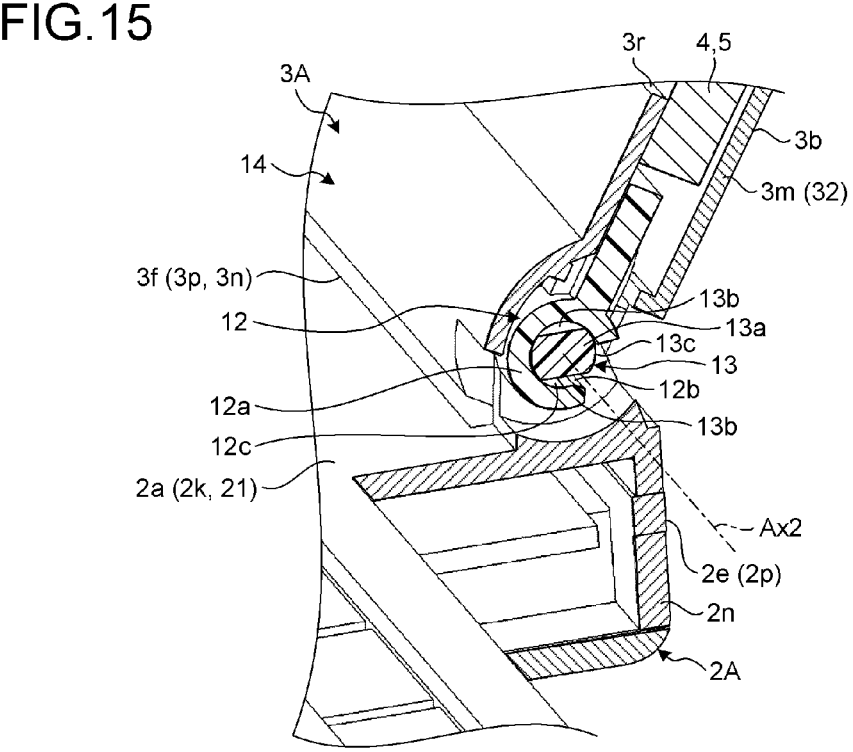
FIG. 15 is an exemplary perspective view of the cross-section including the third engage portion and the fourth engage portion of the electronic device in a state that the third engage portion and the fourth engage portion are engaged and rotated, in the first embodiment.
Figure 16:
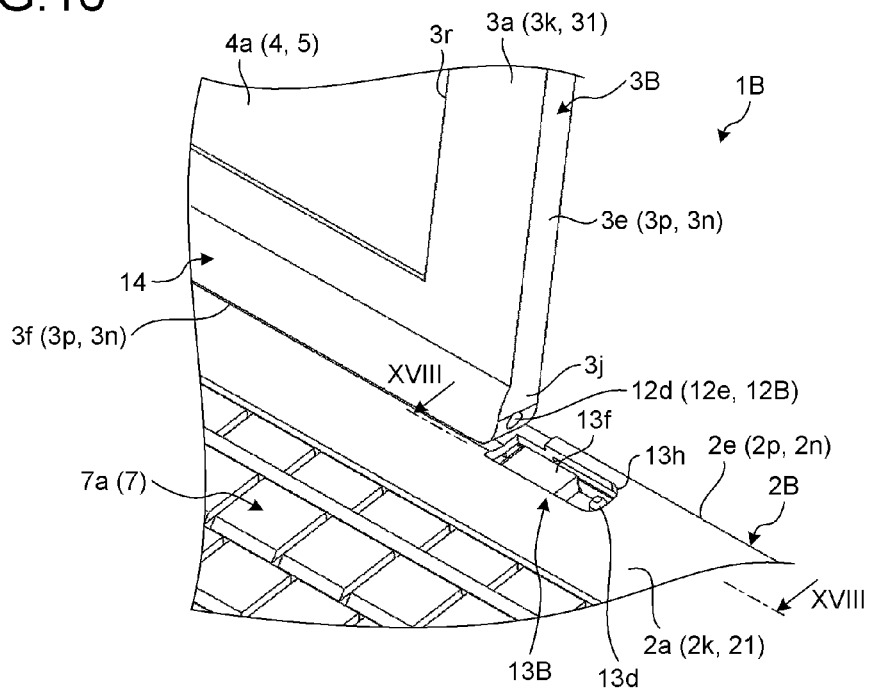
FIG. 16 is an exemplary perspective view of a third engage portion and a fourth engage portion of an electronic device in a state before the third engage portion and the fourth engage portion are engaged, according to a second embodiment.

Furthermore, in the second configuration, a third engage portion 12 provided on the first housing 3A and a fourth engage portion 13 provided on the second housing 2A engage with each other. In the first embodiment, as one example, as illustrated in FIGS. 13 to 15, the third engage portion 12 comprises a surrounding portion 12a configured in a C-shape. On the surrounding portion 12a (a holding portion, a supporting portion, a rotation supporting portion, a bearing portion, a surrounding wall portion, a cover portion), an opening 12b is provided. The fourth engage portion 13 comprises a shaft 13a configured to be inserted inside the surrounding portion 12a through the opening 12b. The shaft 13a comprises, as an outer surface (an outer circumferential surface) thereof, two planar portions 13b substantially in parallel with each other and two curved portions 13c that extend between the ends of the planar portions 13b and aligned with an inner surface 12c (an inner circumferential surface) of the surrounding portion 12a when inserted inside the surrounding portion 12a. Accordingly, when the electronic device 1A changes from the posture illustrated in FIG. 3 to the posture illustrated in FIG. 4, the third engage portion 12 and the fourth engage portion 13 change from the state illustrated in FIG. 13 to the state illustrated in FIG. 14. Specifically, the shaft 13a is inserted into the surrounding portion 12a through the opening 12b. When the electronic device 1A changes from the posture illustrated in FIG. 4 to the posture illustrated in FIG. 5, the third engage portion 12 and the fourth engage portion 13 change from the state illustrated in FIG. 14 to the state illustrated in FIG. 15. Specifically, the surrounding portion 12a surrounding the shaft 13a rotates around the shaft 13a with the rotation axis Ax2 as a center. While the third engage portion 12 is positioned on the outer circumferential side and the fourth engage portion 13 is positioned on the inner circumferential side in the first embodiment as one example, they may be the other way around. The third engage portion 12 and the fourth engage portion 13 only need to be configured such that the member on the outer circumferential side and the member on the inner circumferential side are brought into contact with each other at least at three points around the shaft 13a (the rotation axis Ax2) that are separated from one another, and are not limited to the configuration illustrated in FIGS. 13 to 15. The third engage portion 12 and the fourth engage portion 13 may be composed of, for example, synthetic resin material (for example, polyacetal) or metallic material.

In the first embodiment, as one example, as illustrated in FIGS. 13 and 14, the third engage portion 12 and the fourth engage portion 13 are configured to be attached and detached in a state (a posture) in which the first housing 3A (the surface 3a thereof) and the second housing 2A (the surface 2a thereof) are substantially orthogonal to each other. Consequently, in accordance with the first embodiment, as one example, a user and others can easily find out an angle (a posture) at which the first housing 3A and the second housing 2A are attached or detached. Accordingly, as one example, a user and others can attach or detach the third engage portion 12 and the fourth engage portion 13 more smoothly and more quickly.

In the first embodiment, as one example, as illustrated in FIG. 2, the first engage portion 10 and the second engage portion 11 are provided at positions away from the hinge mechanism 9. Specifically, in the first embodiment, as one example, the first engage portion 10 and the second engage portion 11 are provided on the end portions 3e and 2c (a first end and a second end) of the first housing 3A and the second housing 2A, respectively. The end portions 3e and 2c are not the end portions 3c, 3f, 2e, and 2f connected to the corners 3g and 2j where the hinge mechanism 9 is provided, but are away from the end portions 3c, 3f, 2e, and 2f. Furthermore, the first engage portion 10 and the second engage portion 11 are provided at the corners 3i and 2h (a first end and a second end) of the first housing 3A and the second housing 2A, respectively. The corners 3i and 2h are positioned at the opposing corners of the corners 3g and 2j where the hinge mechanism 9 is provided, and away from the corners 3g and 2j, respectively. In other words, in accordance with the first embodiment, as one example, the first engage portion 10 and the second engage portion 11 are positioned away from the hinge mechanism 9. Consequently, in accordance with the first embodiment, as one example, the first housing 3A and the second housing 2A can be coupled at a plurality of positions (in the first embodiment, two positions as one example) away from one another so as to be more stable. In the first embodiment, as one example, the first engage portion 10 and the second engage portion 11 are provided on the end portions 3e and 2c and at the corners 3i and 2h, respectively. However, it is not limited to these positions, and can be provided, for example, on the end portions 3d and 2d.

Figure 3:
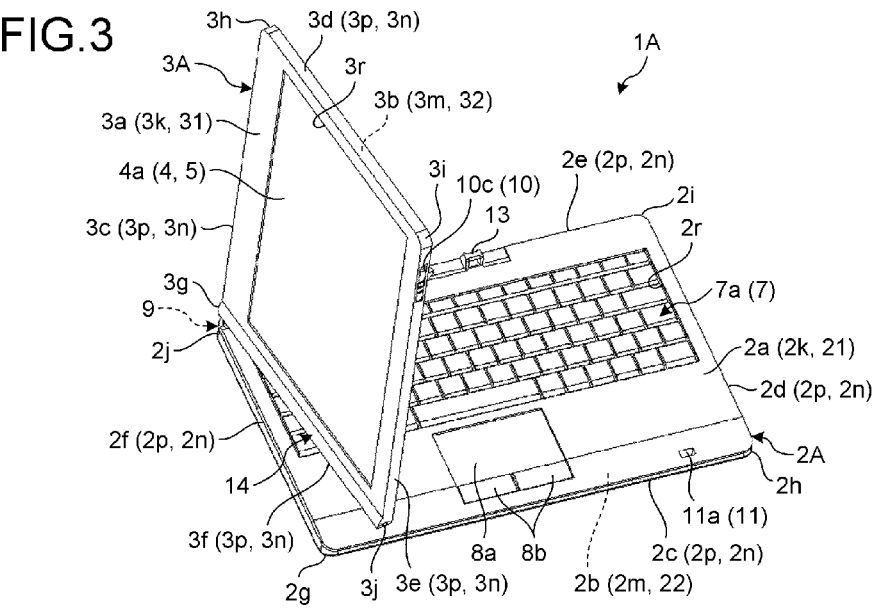
FIG. 3 is an exemplary perspective view of the electronic device in another posture between the first configuration and the second configuration, in the first embodiment.

In the first embodiment, as one example, as illustrated in FIGS. 3 and 4, the third engage portion 12 and the fourth engage portion 13 are provided at positions away from the hinge mechanism 9. Specifically, in the first embodiment, as one example, the third engage portion 12 is provided on the end portion 3f and at the corner 3j of the first housing 3A, and the fourth engage portion 13 is provided in an intermediate portion (at a position away from the corner 2j where the hinge mechanism 9 is provided) of the end portion 2e of the second housing 2A. Consequently, in accordance with the first embodiment, as one example, the first housing 3A and the second housing 2A can be coupled at a plurality of positions (in the first embodiment, two positions as one example) away from one another so as to be more stable.

In the first embodiment, as one example, as illustrated in FIG. 5, the display device 4 (the display screen 4a) and the opening 3r are positioned closer to (nearer) the end portion 3e (a longer side, a second longer side) than to the end portion 3c, which is positioned away from the end portion 3e (positioned opposite the end portion 3e), adjoined to the corner 3g where the hinge mechanism 9 is provided. Consequently, in accordance with the first embodiment, as one example, as illustrated in FIG. 5, the display device 4 is positioned closer to the center in the left-right direction (the longer direction of the keyboard 7) in a use situation of a user and others in the second configuration. Accordingly, as one example, the user and others can easily view the display device 4. In addition, on the end portion 3c side inside the first housing 3A, it is easy to secure a space for housing a drive circuit for the display device 4, constituent elements of the hinge mechanism 9 (as one example, the third member 9c and the fourth member 9d), and others. Moreover, although not illustrated, in the area along the end portion 3c that is wider in margin, an area (a portion) thicker than the other areas of the first housing 3A can be provided. In this case, it is easier to secure the space for housing the constituent elements of the hinge mechanism 9 and others on the end portion 3c side inside the first housing 3A. Furthermore, a user and others can easily grasp the first housing 3A (the electronic device 1A) at the thickened portion of the first housing 3A in the first configuration illustrated in FIG. 1 or in the second configuration illustrated in FIGS. 4 and 5.

In the first embodiment, as one example, as illustrated in FIG. 5, the display device 4 (the display screen 4a) and the opening 3r are positioned closer to (nearer) the end portion 3d (a shorter side, a second shorter side) than to the end portion 3f (a shorter side, a first shorter side), which is positioned away from the end portion 3d (positioned opposite the end portion 3d), adjoined to the corner 3g where the hinge mechanism 9 is provided. Consequently, in accordance with the first embodiment, as one example, as illustrated in FIG. 5, the display device 4 is positioned raised in the up-down direction in a use situation of a user and others in the second configuration. Accordingly, as one example, on the end portion 3f side inside the first housing 3A, it is easy to secure a space for housing a drive circuit for the display device 4, constituent elements of the hinge mechanism 9 (as one example, the third member 9c and the fourth member 9d), the third engage portion 12, and others. Furthermore, in the first embodiment, as one example, as illustrated in FIGS. 1, 4, and 5, in the area along the end portion 3f that is wider in margin, an area 14 (a portion) thicker than the other areas of the first housing 3A can be provided. In this case, it is easier to secure a space for housing the constituent elements of the hinge mechanism 9, the third engage portion 12, and others on the end portion 3f side inside the first housing 3A. Moreover, the user and others can easily grasp the first housing 3A (the electronic device 1A) at the thickened portion of the first housing 3A in the first configuration illustrated in FIG. 1.

As explained in the foregoing, in the first embodiment, as one example, the electronic device 1A comprises the hinge mechanism 9 that rotatably connects the corner 3g of the first housing 3A and the corner 2j of the second housing 2A, and can take at least the first configuration in which the first housing 3A covers the keyboard 7 (the surface 2a) and the first housing 3A and the second housing 2A are placed one on top of the other in the thickness directions thereof and the second configuration in which the end portion 3f of the first housing 3A is aligned with the end portion 2e of the second housing 2A and the first housing 3A and the second housing 2A intersect each other. Consequently, in accordance with the first embodiment, as one example, a user and others can use the electronic device 1A as the electronic device 1A of a tablet type (slate type) in the first configuration, and as the electronic device 1A with the display device 4 arranged in a vertical posture that is longer in a direction of the display device 4 intersecting the keyboard 7 in the longer direction (an up-down direction) in the second configuration. In accordance with the first embodiment, as one example, the first housing 3A and the second housing 2A are coupled with each other through the hinge mechanism 9. Accordingly, as one example, as compared with a situation where the first housing 3A and the second housing 2A are separated, an inconvenience such as losing or misplacing one of the housings is likely to be avoided.

In the first embodiment, as one example, in the first configuration (see FIG. 1) of the electronic device 1A, the first housing 3A and the second housing 2A are coupled by the hinge mechanism 9 and the first engage portion 10 and the second engage portion 11 that are provided away from the hinge mechanism 9. Consequently, the first housing 3A and the second housing 2A can be coupled more stably in the first configuration.

In the first embodiment, as one example, in the second configuration of the electronic device 1A (see FIGS. 4 and 5), the first housing 3A and the second housing 2A are coupled by the hinge mechanism 9 and the third engage portion 12 and the fourth engage portion 13 that are provided away from the hinge mechanism 9. Consequently, the first housing 3A and the second housing 2A can be coupled more stably in the second configuration.

An electronic device 1B illustrated in FIGS. 16 to 22 according to a second embodiment is different from the electronic device 1A in the first embodiment in terms of the configuration of a third engage portion 12B and a fourth engage portion 13B. The electronic device 1B in the second embodiment is the same as the electronic device 1A in the above-described first embodiment except for the third engage portion 12B and the fourth engage portion 13B being different. Furthermore, the electronic device 1B in the second embodiment can achieve the same result (effects) as that in the first embodiment based on the same configuration.

In the second embodiment, as one example, as illustrated in FIGS. 16 to 22, the third engage portion 12B includes a tubular portion 12d (a surrounding portion, a holding portion, a supporting portion, a rotation supporting portion, a bearing, a circumferential wall, a cover) in a hollow cylindrical form provided at the corner 3j of a first housing 3B. In the second embodiment, as one example, the tubular portion 12d is provided on the wall 3n of the first housing 3B. However, it is not limited to this example, and it can be configured as a separate component secured onto the first housing 3B. Meanwhile, the fourth engage portion 13B includes a cylindrical protruding portion 13d (a projection, an inserting portion, a shaft portion) that is inserted into an inner tubular portion 12e (a recess, an opening, a housing portion) of the tubular portion 12d. The tubular portion 12d supports the protruding portion 13d to be rotatable around the rotation axis Ax2. Consequently, in accordance with the second embodiment, as the same as that in the first embodiment, the third engage portion 12B and the fourth engage portion 13B are coupled with (latched onto, engaged with, supported) each other at a position away from the hinge mechanism 9, whereby the first housing 3B and a second housing 2B can be coupled more stably in the second configuration.

Figure 17:
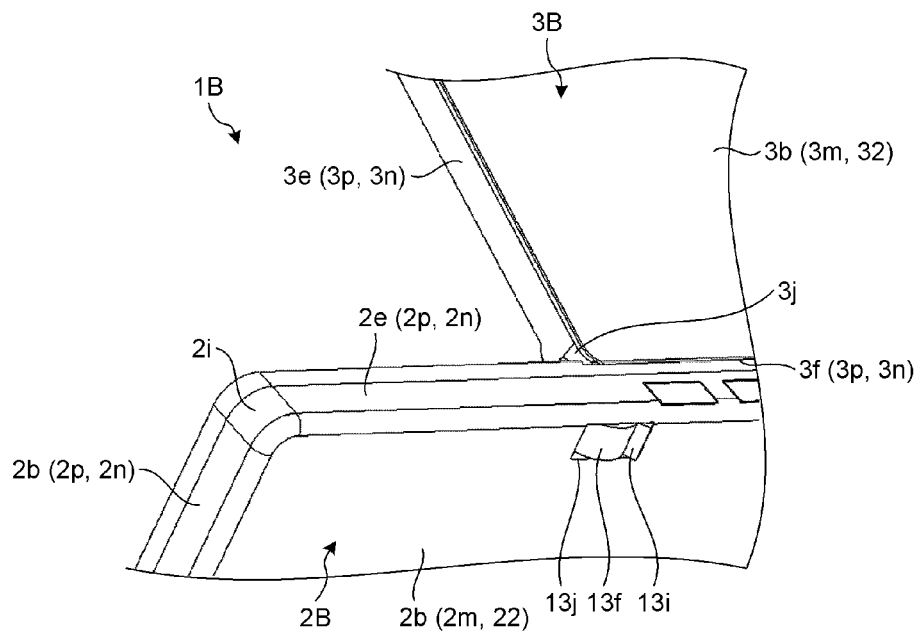
FIG. 17 is an exemplary perspective view of the electronic device in a state corresponding to that in FIG. 16 when viewed from another angle, in the second embodiment.
Figure 18:
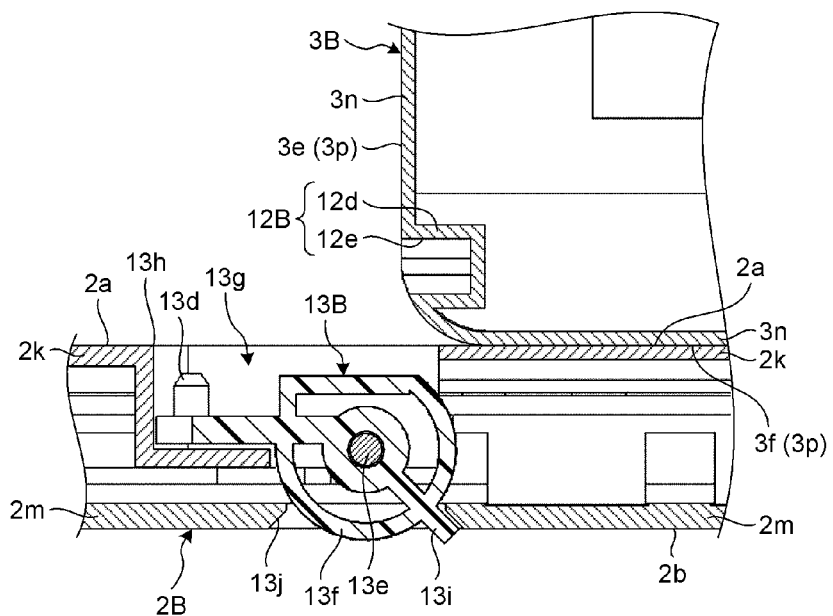
FIG. 18 is an exemplary cross-sectional view diagram taken along the line XVIII-XVIII in FIG. 16 in the second embodiment.
Figure 19:
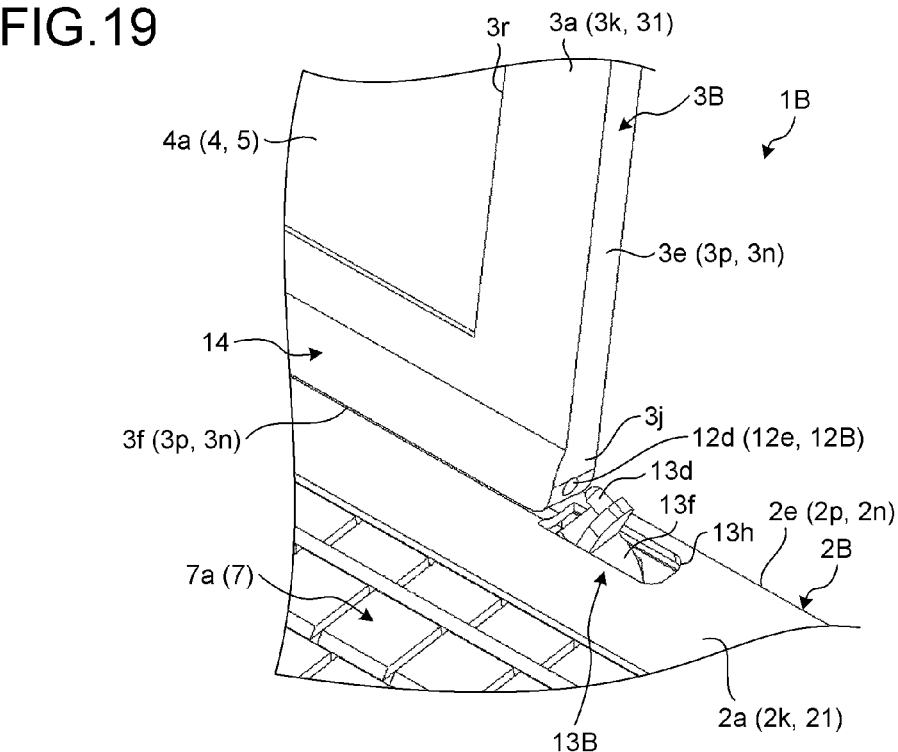
FIG. 19 is an exemplary perspective view of the third engage portion and the fourth engage portion of the electronic device in another state before the third engage portion and the fourth engage portion are engaged, in the second embodiment.
Figure 20:
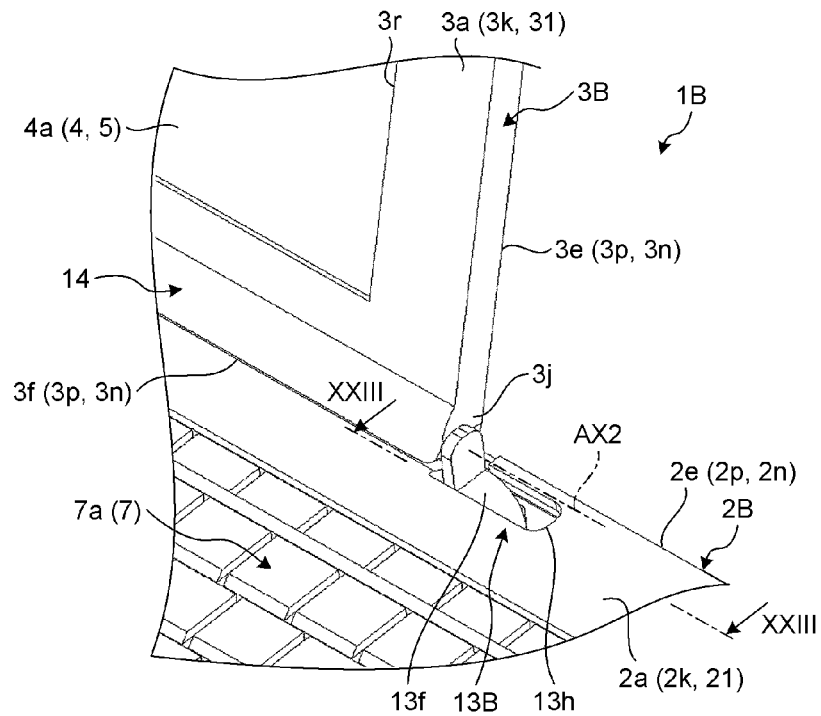
FIG. 20 is an exemplary perspective view of the third engage portion and the fourth engage portion of the electronic device in a state that the third engage portion and the fourth engage portion are engaged, in the second embodiment.
Figure 21:
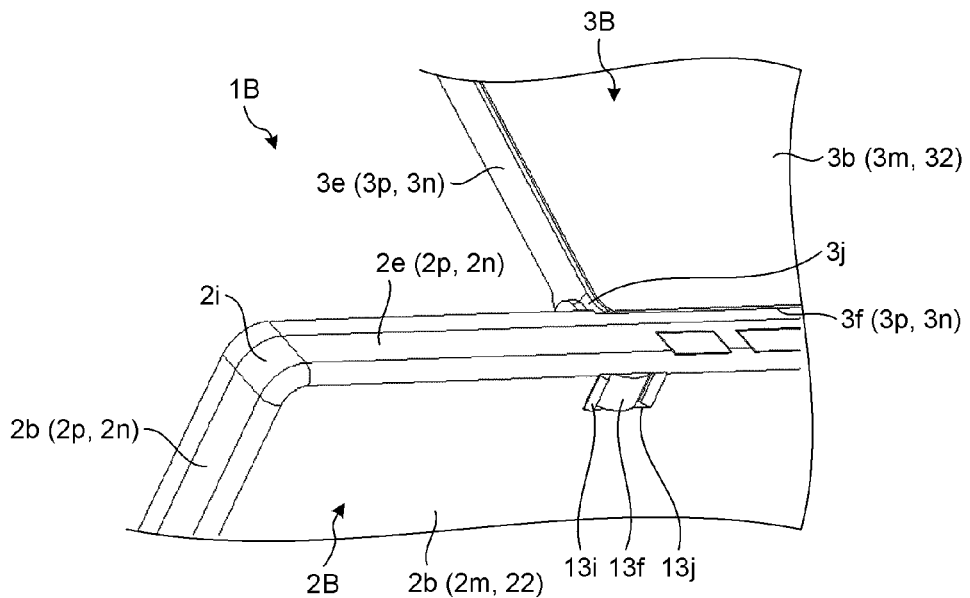
FIG. 21 is an exemplary perspective view of the electronic device in a state corresponding to that in FIG. 20 when viewed from another angle, in the second embodiment.
Figure 22:
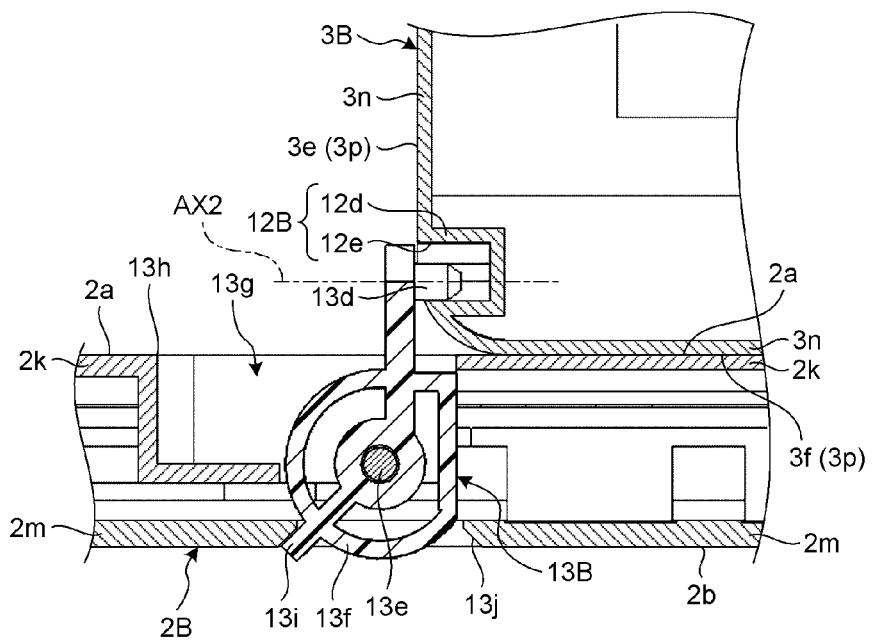
FIG. 22 is an exemplary cross-sectional diagram taken along the line XXII-XXII in FIG. 20 in the second embodiment.

Furthermore, in the second embodiment, as one example, the fourth engage portion 13B is supported by the second housing 2B to be rotatable (to be movable, to project and retract). Specifically, as illustrated in FIGS. 18 and 22, the fourth engage portion 13B comprises a shaft portion 13e secured to the second housing 2B and a moving portion 13f supported to be rotatable around the shaft 13e. On the moving portion 13f, the protruding portion 13d is provided. The fourth engage portion 13B is housed inside a housing portion 13g (a space, a gap) provided on the second housing 2B. The housing portion 13g is opened on the surface 2a side of the second housing 2B through an opening 13h, and the protruding portion 13d can move between a first state in which the protruding portion 13d is protruded on the surface 2a through the opening 13h and inserted in the tubular portion 12d (see FIGS. 20 to 22, a first position, a protruded state, a coupled state) and a second state in which the protruding portion 13d is moved away from the tubular portion 12d and retracted in the housing portion 13g from the opening 13h (see FIGS. 16 to 18, a second position, a receded state, a sunken state, a housed state, a stored state, a suspended state). On the side opposite to the protruding portion 13d of the moving portion 13f, an operating portion 13i (a protruding portion, a finger grip portion, a handle) is provided. The housing portion 13g is opened on the surface 2b side of the second housing 2B through an opening 13j, and the operating portion 13i is exposed toward the lower side of the surface 2b from the opening 13j. Accordingly, as illustrated in FIGS. 17 and 21, a user and others can operate the operating portion 13i exposed on the surface 2b side to rotate the moving portion 13f around the shaft portion 13e so as to switch the states between the first state and the second state. The moving portion 13f may be composed of synthetic resin material (for example, polyacetal) or metallic material.

In accordance with the second embodiment in the foregoing, by the third engage portion 12B and the fourth engage portion 13B different in configuration from those of the above-described first embodiment, the first housing 3B and the second housing 2B can be coupled more stably in the second configuration.

Figure 23:
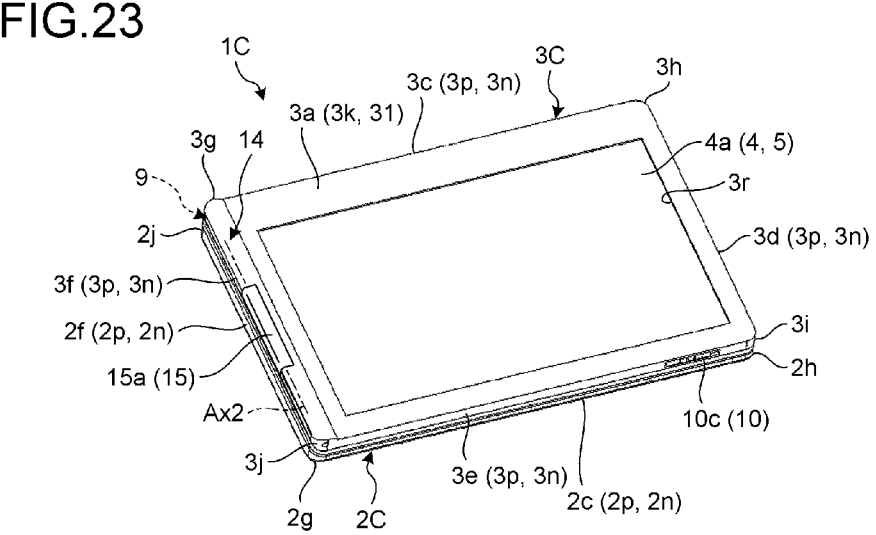
FIG. 23 is an exemplary perspective view of an electronic device in a first configuration, according to a third embodiment.
Figure 24:
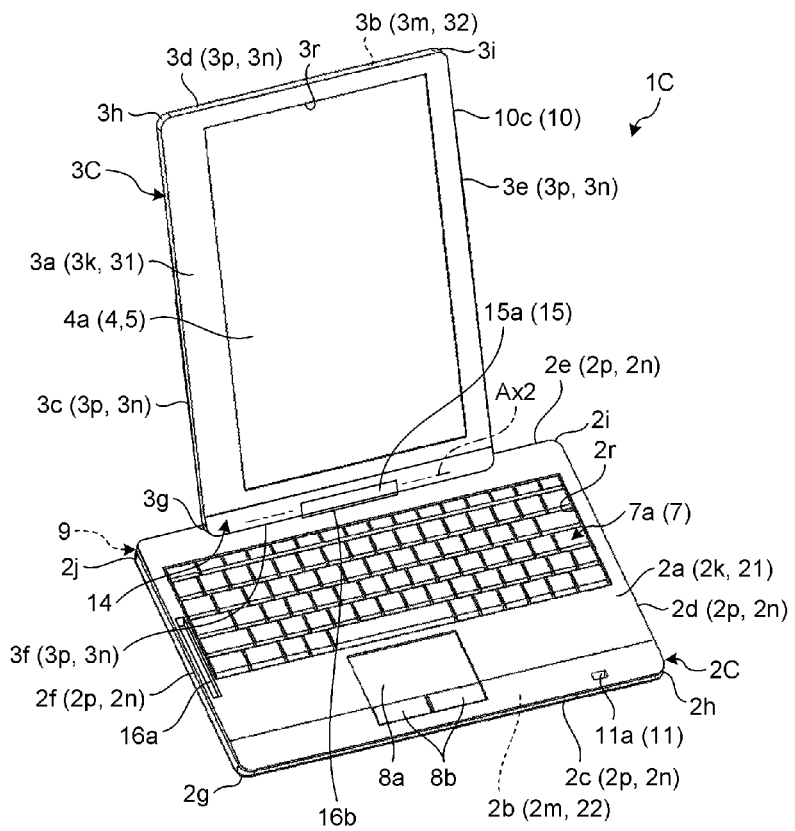
FIG. 24 is an exemplary perspective view of the electronic device in a second configuration, in the third embodiment.

In an electronic device 1C according to a third embodiment illustrated in FIGS. 23 and 24, a first housing 3C and a second housing 2C are detachably coupled by a coupling portion 15 (a connecting portion, a binding portion, a connector) provided on the first housing 3C and coupling portions 16a and 16b (connecting portions, binding portions, connectors) provided on the second housing 2C. In other words, the first housing 3C and the second housing 2C are separable and combinable. In the first configuration illustrated in FIG. 23, the coupling portion 15 and the coupling portions 16a and 16b couple the first housing 3C and the second housing 2C mechanically. The coupling portions 15, 16a, and 16b are provided with connectors (not illustrated) that connect the first housing 3A (inner substrates and electrical components thereof) and the second housing 2A (inner substrates and electrical components thereof) electrically. Furthermore, one of the coupling portion 15 and the coupling portions 16a and 16b (in the third embodiment, the coupling portion 15 as one example) includes a moving portion (in the third embodiment, a moving portion 15a as one example) that is movably (rotatably) supported by the first housing 3C or the second housing 2C. In the third embodiment, as one example, the moving portion 15a is supported by the first housing 3C to be rotatable around the rotation axis Ax2 along the end portion 3f. Therefore, in accordance with the third embodiment, as one example, in the second configuration illustrated in FIG. 24, a user and others can variably set the angle between the first housing 3C and the second housing 2C. In accordance with the third embodiment in the foregoing, the electronic device 1C can take the first configuration and the second configuration, and thus the same effects as those in the first embodiment and the second embodiment can be achieved. In addition, in the third embodiment, as one example, in the second configuration, the first housing 3C is positioned further closer to the center of the second housing 2C in the longer direction.

Furthermore, the configurations and shapes in each of the embodiments can be implemented by being partially replaced with one another. The specifications (such as the construction, type, direction, shape, size, length, width, thickness, height, number of pieces, arrangement, position, and material) of each of the configurations and shapes can be implemented with appropriate changes.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a first housing configured to be substantially flat, substantially rectangular and substantially parallelepiped shaped and comprising a display comprising a screen;
a second housing configured to be substantially flat, substantially rectangular and substantially parallelepiped shaped, and comprising a keyboard; and
a hinge configured to rotatably connect a first corner of the first housing and a second corner of the second housing with each other, wherein
the electronic device is capable of taking at least: a first configuration in which the first housing covers the keyboard and in which the first housing and the second housing are overlapped in a thickness direction; and a second configuration in which a shorter side of the first housing is aligned with a longer side of the second housing and in which the first housing and the second housing intersect each other, and
the hinge comprises a first portion, a second portion, and a third portion, the first portion being secured to the first corner of the first housing, the second portion being configured to support the first portion to be rotatable around a first rotation axis and to support the third portion to be rotatable around a second rotation axis intersecting the first rotation axis, the third portion being secured to the second corner of the second housing.

2. The electronic device of claim 1, wherein
the first housing comprises a first engage portion in a first end portion away from the hinge, and
the second housing comprises a second engage portion in a second end portion away from the hinge and configured to engage with the first engage portion in the first configuration.

3. The electronic device of claim 1, wherein
the first housing comprises a third engage portion on the shorter side, and
the second housing comprises a fourth engage portion on the longer side and configured to engage with the third engage portion in the second configuration.

4. The electronic device of claim 3, wherein the third engage portion and the fourth engage portion are detachable in a state in which the first housing and the second housing are substantially orthogonal to each other.

5. The electronic device of claim 1, wherein the display in the first housing is closer to a second longer side than a first longer side adjoined to the first corner, the second longer side being opposite the first longer side.

6. The electronic device of claim 1, wherein the display in the first housing is closer to a second shorter side than a first shorter side adjoined to the first corner, the second shorter side being opposite the first shorter side.

7. The electronic device of claim 5, wherein the first longer side comprises a portion thicker than other portions.

8. The electronic device of claim 6, wherein the first shorter side comprises a portion thicker than other portions.

* * * * *